W. F. FOX.
PHOTOGRAPHIC PROCESS.
APPLICATION FILED JUNE 23, 1914.
1,207,527.
Patented Dec. 5, 1916.
Fig. 1,
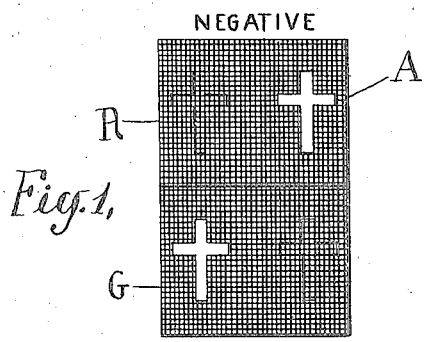
Fig. 2,
PRINT FROM RED NEGATIVE
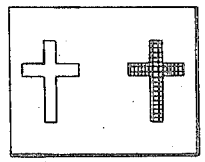
Fig. 3,
PRINT FROM GREEN NEGATIVE
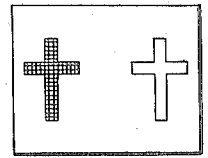
Fig. 4,
IMAGE ON PROJECTING POSITIVE
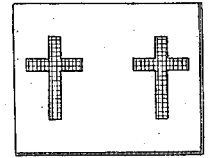
Fig. 5,
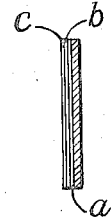
WITNESSES
INVENTOR
William F. Fox
BY
Edmunds
ATTORNEY

UNITED STATES PATENT OFFICE.

WILLIAM FRANCIS FOX, OF NEW YORK, N. Y., ASSIGNOR TO KINEMACOLOR COMPANY OF AMERICA, OF NEW YORK, N. Y., A CORPORATION OF DELAWARE.

PHOTOGRAPHIC PROCESS.

1,207,527.   Specification of Letters Patent.   Patented Dec. 5, 1916.

Application filed June 23, 1914. Serial No. 846,738.

*To all whom it may concern:*

Be it known that I, WILLIAM FRANCIS FOX, a subject of the King of Great Britain, residing at Beechhurst, in the borough of Queens, city and State of New York, have invented certain new and useful Improvements in Photographic Processes, of which the following is a specification.

The invention relates, generally, to a photographic process for the production of colored pictures, and, while applicable to the production of single photographs in color, is peculiarly adapted for use in connection with the production of colored photographs in continuous series for use in the art of kinematography.

The method of colored moving-picture photography and reproduction as heretofore practised has involved the use of special apparatus (for taking and for projecting) and a special film of substantially twice the length commonly employed in the projection of pictures in monochrome. In the special camera so employed, it has been customary to use a light filter, through which the exposures have been taken, such filter being partly of green and partly of red material, one exposure being taken through the green portion and the next adjacent exposure through the red portion. As a result, each two adjacent images upon the film have been affected, as to color, by the interposed filter, an image taken through the green portion of the filter having red color-sensations omitted therefrom and an image taken through the red portion of the filter having green color-sensations omitted therefrom. In the projection of moving pictures by means of a positive print made from such a film, a corresponding color-filter is employed, whereby the pictures, as exhibited, are reproduced in substantially the colors by which they were originally characterized. Objections to this method are, *inter alia*, the necessity for special projecting apparatus, involving the use of the color-filter; also the excessive length of the film (approximately twice that used in monochrome moving-picture reproduction), and the high speed at which the reproduction must proceed in order that the colors shall be suitably merged in the pictures as exhibited upon the screen.

One object of my invention, when the same is employed in connection with the art of colored moving-picture photography, is to produce a film which can be exhibited by means of a projecting machine of ordinary construction, *i. e.*, of the character commonly employed for the reproduction of monochrome pictures, and therefore not employing the color-filter such as above referred to.

A further object is to produce a film which can be projected at substantially the speed at which moving-picture films in monochrome are now being projected, thus avoiding the difficulty of excessive speed, ordinarily harmful to both film and projecting machine, which characterized the reproduction of pictures by means of a film of excessive length.

A further object of the invention is to produce a colored moving-picture film each of the photographic images upon which is characterized by substantially the colors appearing in the object originally photographed, such colors being applied by suitable baths, rather than by any process heretofore suggested or employed.

In carrying out my invention, I first produce two negative images, one taken through a green filter and another through a red filter, and from these obtain a positive print, which may be colored in the manner hereinafter described. This is a broad statement of the process, applicable whether the object be to produce a single discrete colored photograph or an extended series of such photographs suitable for moving-picture reproduction. It being understood that the invention is equally applicable to either, I shall proceed from this point to disclose the same in its application to the production of a film of substantial length, suitable for use in colored moving-picture projection.

By means of a suitable camera, employing a color-filter such as above suggested, a series of images is formed upon a strip of transparent or translucent material coated with panchromatic emulsion, each two images of the series being taken, one through the red portion of the filter and the other through the green portion of the filter. Then, either by direct or optical printing, I produce a positive print on similar material, impressing upon this two of the negative images, one taken through the green portion of the filter (and which I shall hereinafter refer to as the "green image"), and the other taken through the red portion of the filter. These images are precisely superimposed upon the positive stock, either upon one side thereof or one upon each side thereof, after which said images upon the positive stock are colored in the manner hereinafter described in detail, one by the application of red color thereto and the other by the application of green color thereto, or by the alternative process of so treating the silver deposit of the positive image as to tone the same green.

In the drawings, I have illustrated, and I shall hereinafter proceed to describe, the steps involved in a preferred method of practising the invention herein referred to.

In said drawings, Figure 1 is a plan view of a negative film resulting from the photographing, through alternate red and green filters, of an object including two crosses, one red and the other green, against a white background, the red cross being that at the left; Fig. 2 is a similar view of a positive reproduction, from said negative, of what I term the "red image" thereon; Fig. 3 is a similar view of a positive reproduction, from said negative, of what I term the "green image" thereon; Fig. 4 is a similar view, illustrating the projecting positive film, bearing thereon an image caused by the superimposition of the two prints illustrated in Figs. 2 and 3; and Fig. 5 is a central sectional view, on exaggerated scale, of the positive picture shown in Fig. 4.

The first step in the process involves the production of a suitable negative, from which a projecting positive may be obtained. Using suitable transparent or translucent material, such, for example, as ordinary pyroxylin stock coated with panchromatic emulsion, a series of pictures is taken by means of a camera employing a red and green color-filter, one image, R, being taken through the red portion of the filter and the next adjacent image, G, through the green portion of the filter. The resulting negative strip, A, is then developed, fixed and dried, in well-known manner.

The next step is to produce by means of such negative strip a positive strip, termed herein a "projecting positive," and this is accomplished by reproducing, also upon transparent or translucent film stock, suitably sensitized, all of the images upon the negative strip, but superimposing on the positive strip each two adjacent images of the negative strip, one taken through the red filter and the other through the green filter, as above described. In accomplishing this, I may employ a strip of film having the sensitive emulsion on both sides thereof, one of the images being impressed upon one side and the other image upon the other side, one being thereafter colored red and the other green. There are, however, mechanical, as well as optical, difficulties in following this practice, because of which I prefer that the two images in question should be superimposed upon the same side of the film stock, and this is accomplished in the following manner: After reproducing upon the positive film stock (see Fig. 2) the red image of the negative A, such image is developed in the usual manner but not fixed. This image is then toned bluish-green by immersion in a toning solution. This is done in the dark room. The positive film is immersed in a bath which will tone the silver deposit thereon bluish-green with an intensity depending upon the quantum of silver deposit constituting the image. That is, a heavy deposit becomes a darker color than a lighter deposit. Such a bath may be compounded by means of the following formula:

Vanadium chlorid_____ 1 ounce.
Ferric chlorid_____ ½ ounce.
Ferric ammonium oxalate_____ ½ ounce.
Potassium ferricyanid_____ 1 ounce.
Oxalic acid (saturated solution) 60 ounces.
Water sufficient to bring the whole up to 1,000 ounces.

After the positive film has been immersed in a bath, such as that described, it is necessary to well wash the same and then immerse it in a very weak sodium thiosulfate bath which is not sufficiently strong to affect to any appreciable extent the sensitiveness of the remaining unaltered silver bromid, but brightens up the bluish green image, the surplus salts of which are extremely soluble in sodium thiosulfate. Such a bath may be of a one per cent. solution of sodium thiosulfate.

Having now referred to the process involved in impressing the red image of the negative A upon the positive film stock, the next step is to superimpose upon that print a print from the green image of the negative A. This may be done either by direct or optical printing, the exposure being about twice that allowed in printing the red image upon said positive owing to a slight action of the toning solution which decreases to a slight extent the sensitivity of the unaltered silver bromid remaining. After the superimposed green image has been so printed, the film may be developed and fixed, after which it is thoroughly washed. Next, this second print (Fig. 3) upon the positive film stock is mordanted or made so that the silver will take up dye, and for this purpose it may, if desired, be immersed in a bath of substantially the following constituents:

Potassium iodid_____ ½ ounce.
Potassium ferricyanid _____ 1 ounce.
Water sufficient to bring the whole up to 500 ounces.

After the film has been so treated, it may be washed clear and then immersed in a one per cent. solution of any suitable anilin dye, such as acridin scarlet or rhodamin, in which it is allowed to remain until complete absorption has taken place, after which the surplus dye may be washed out. As a result of this coloring step, it will be found that the gelatin portion of the film in which there is no silver deposit is quite clear, the silver deposit alone having retained the color. The film may now be hardened in a bath of tannin solution and then immersed in a sodium thiosulfate fixing bath, in order to remove any surplus silver salt remaining in the film and clear the red image. After washing, the film (Fig. 4) is ready for drying.

As alternative methods of superimposing the green image upon the red image on the projecting positive, I may point out that whereas I have above described effecting this without resensitizing the surface of the positive film upon which the red image has already been impressed, I may, if desired, provide the image-bearing surface of said projecting positive film with a new coating of emulsion, which may be applied directly over the original emulsion ($a$, Fig. 5) upon said strip, or, if desired, the latter may be given a protecting coating ($b$) of a transparent material, such, for instance, as celluloid, and the new coating of sensitive emulsion ($c$) may be applied thereover. It should be noted, however, that where the second impression is formed upon new sensitive emulsion, the first impression, in addition to having been developed and toned, should also have been fixed. Apart from this, the coloring step may be practised in accordance with the following disclosure, regardless of whether the second impression be formed upon the original sensitive coating of the positive stock or upon a new coating placed over such original coating.

As will be seen, I have described the red coloring step as comprising first a bath which will mordant the silver deposit, and next immersion in a color, whereas, in connection with the original image impressed upon the positive film stock, I have stated a preference for a coloring step involving turning the silver deposit green by toning.

While I have hereinabove described a preferred method of practising my invention, involving the superimposition of both the red and green negative images upon the same side of the positive film stock, it should be understood that if it be desired to place these images upon opposite sides of the positive film stock, one image being colored green and the other red, this may be accomplished as follows:—After impressing both the red and the green negative images upon opposite sides of the positive film stock, and in superimposition, the film may be immersed in the bath first above described which has the effect of mordanting the silver deposit and also toning the same green. Since it would be desired to retain the green only in one of the images, the film, after being developed, fixed and dried, would be provided upon one side (for instance, that bearing the green image) with a waterproofing coating, such, for example, as transparent celluloid. If, after this has been done, the film is immersed in a suitable anilin dye, the waterproofed side, bearing the green image, will not be affected but the image upon the other side will absorb such dye all over the film equally. Then, by immersion in a suitable bath, the dye in the image in question (now the red image) can be washed out, from the clear portions only of the gelatin, the portions represented by silver deposit retaining the dye permanently. When in this red image the clear portions of the gelatin have been so washed clean and the film immersed in a tannic acid bath and in a sodium thiosulfate bath as hereinabove explained, the result is an image in red directly superimposed over the image in green upon the other side of the film. After drying in usual manner, the film may be employed for exhibition or projection, as herein contemplated.

I desire it to be clearly understood, as above indicated, that the invention is important in connection with the production of single photographs in substantially the original colors, as well as with the production of similarly colored photographs in series for moving-picture reproduction, and that the invention, therefore, is not limited in the respect noted.

It should be understood that the claims herein are not to be construed as strictly limited to a process in which one print is colored before the other print is impressed on the positive stock, since in the last described form of my invention both prints may be impressed before either is colored. The first described form of my invention, however, is preferred.

Having now described my invention, what I claim as new therein and desire to secure by Letters Patent is as follows:—

1. A photographic process comprising the production of two negative images, one taken through a green filter and one through a red filter, imprinting one of said images upon light transmitting material, coated with a sensitive emulsion, toning the print to a color complementary to that of the screen through which the corresponding negative was taken, imprinting the other of said images on said material in registry with the first image imprinted thereon, and coloring the second image a color complementary to that of the screen through which its negative was taken, substantially as set forth.

2. A photographic process comprising the production of two negative images, one taken through a green filter and one through a red filter, imprinting one of said images upon light transmitting material, coated with a sensitive emulsion, toning the print to a color complementary to that of the screen through which the corresponding negative was taken, imprinting the other of said images on said material in registry with the first image imprinted thereon, mordanting the second image and dyeing the same with a suitable dye, which will impart to the image a color complementary to that of the screen through which its negative was taken, substantially as set forth.

3. A photographic process comprising the production of two negative images, from one of which certain color sensations have been omitted and from the other of which complementary color sensations have been omitted, imprinting one of said images upon light transmitting material, having a suitable sensitive surface, coloring the print with a color corresponding to the sensations omitted from the corresponding negative, imprinting the other of said images on said material in registry with the first image imprinted thereon, and coloring said image with a color corresponding to the sensations omitted from the corresponding negative, one of said images being colored by toning the same in an appropriate toning bath, and the other of said images being colored by mordanting the same and dyeing the same with an appropriate dye, substantially as set forth.

This specification signed and witnessed this 22d day of June, 1914.

WILLIAM FRANCIS FOX.

Witnesses:
I. McIntosh,
F. Drahas.